United States Patent Office 3,132,168
Patented May 5, 1964

3,132,168
PROCESS FOR PREPARING ORGANO-
HALOSILANES
John Mackinnon, Fords, N.J., assignor to General Electric Company, a corporation of New York
No Drawing. Filed May 18, 1961, Ser. No. 110,895
1 Claim. (Cl. 260—448.2)

The present invention relates to a method for making organohalogenosilanes. More particularly, the present invention relates to a method for promoting reaction between heated silicon powder and organic halides by passing an organic halide through heated silicon powder in the presence of aluminum chloride.

The method which involves the passage of an organic halide through heated silicon powder, as described in Rochow Patent 2,380,995, is presently employed by industry for the production of various organohalogenosilanes, including diorganodihalogenosilanes. While this method has been commercially successful, it has been noted that silicon utilization in the method is not as complete as desired. For example, during the reaction between the organic halide and the silicon, often when about 50% by weight of the silicon charge has been consumed, the conversion of the organic halide to organohalogenosilanes falls off sharply, or the quality of the reaction product is adversely affected, that is, the mole percent diorganodihalogenosilane in the product drops below the acceptable minimum. As a result it is necessary to terminate the reaction and discard the remaining silicon.

It has now been discovered that if this silicon powder rendered unsuitable for the further production of organohalogenosilanes, as a result of being contacted with an organic halide at elevated temperatures until at least 50% and up to 90% by weight of the silicon powder has been reacted, is caused to react further while in a heated condition with a mixture of an organic halide and aluminum chloride, the conversion of organic halide to organohalogenosilanes is surprisingly improved, while increase in utilization of the silicon powder is realized.

In accordance with the present invention, there is provided a process for the production of organohalogenosilanes comprising (1) passing a mixture of an organic halide and aluminum chloride through heated silicon powder and (2) recovering the organohalogenosilanes so produced, where there is present in said mixture of (1) from 0.1 to 10 mole percent of aluminum chloride based on the total moles of aluminum chloride and said organic halide, where said heated silicon powder of (1) is the solid residue of reaction at temperatures between 200° C. to 500° C. of a powdered mixture of silicon and a metal catalyst and an organic halide after at least 50% and up to 90% by weight of the silicon in said powdered mixture of silicon and metal catalyst has been reacted.

The organic halides which react with silicon in the process of the present invention have the formula:

(1) $\qquad$ RX where X is a halogen radical such as chloro and bromo and R is a monovalent organic radical, such as a hydrocarbon radical selected from the class consisting of alkyl radicals, e.g., methyl, ethyl, propyl, butyl, octyl, etc. radicals; aryl radicals, e.g., phenyl naphthyl, tolyl, xylyl, etc. radicals; aralkyl radicals, e.g., phenylethyl, benzyl, etc. radicals; alkenyl radicals, e.g., vinyl, allyl, etc. radicals; alkynyl radicals, e.g., ethynyl, propynyl, etc. radicals; cycloalkyl radicals, e.g., cyclohexyl, cycloheptyl, etc. radicals; and cycloalkenyl radicals, e.g., cycloheptenyl, cyclohexenyl radicals, etc. Among the preferred organic halides within the scope of Formula 1 can be mentioned, for example, chlorobenzene, methyl chloride and ethyl chloride, with the preferred specific organic halide being methyl chloride.

When the organic halides of Formula 1 react with elemental silicon, the products formed consist primarily of organohalosilanes having the formula:

(2) $\qquad$ $R_nSiX_{4-n}$ where X and R are as previously defined and n is an integer equal to from 1 to 3, inclusive. Specific examples of these organohalosilanes include methyltrichlorosilane, dimethyldichlorosilane, and trimethylchlorosilane which are formed from methyl chloride; phenyltrichlorosilane, diphenyldichlorosilane, and triphenylchlorosilane which are formed from chlorobenzene; and various other organohalosilanes such as diethyldichlorosilane, dibenzyldichlorosilane, vinyltrichlorosilane, etc., which are formed from the appropriate organic halide.

Silicon powder having an average particle size in the range of about 20 to 200 microns can be employed in the practice of the present invention. A catalyst that can be intimately associated with the silicon powder is copper metal. A variety of copper metal catalysts is shown in Ferguson et al. Patent 2,443,902, which can be present in amounts equal to from about 3 to 30 percent by weight of the silicon.

The term "spent powder" as used hereinafter will signify a powdered mixture of silicon and a catalyst that has been employed in the production of organohalogenosilanes in accordance with the teachings of the prior art, until 50 to 90 percent of the initial weight of the silicon has been reacted. In addition, the mixture of silicon and catalyst becomes spent within the definition of the present invention when the mixture is incapable of producing at least .03 part per hour of organohalogenosilane reaction product, shown in Formula 2 per part of mixture employed when an organic halide (Formula 1) is passed through it at atmospheric pressure, i.e. 750 mm. to 760 mm. while the mixture is heated. The aforesaid reaction product of organohalogenosilanes is preferably a mixture containing at least 10 mole percent of diorganodihalogenosilane.

In the practice of the invention, a mixture of an organic halide as shown in Formula 1 and aluminum chloride is passed through spent silicon powder while in a heated condition and the resulting evolved mixture of organohalogenosilanes is recovered.

The mixture of the organic halide and aluminum chloride can be formed prior to the passage of the mixture through the spent powder by contacting the organic halide with the aluminum chloride while the aluminum chloride has been heated above its sublimation temperature. For example, the mixture of organic halide and aluminum chloride employed in the practice of the present invention is formed by placing aluminum chloride in contact with the organic halide at some point between the organic halide source and where the organic halide initially contacts the spent powder. While the organic halide is passed through the spent powder, the aluminum chloride can be incorporated with the organic halide over a range of concentrations by heating the aluminum chloride to a temperature above its sublimation temperature. The molar concentration of the aluminum chloride in the organic halide and aluminum chloride mixture can be readily determined by calculating the vapor pressure of the aluminum chloride at the particular temperature utilized. The vapor pressure of aluminum chloride is readily determined at a particular temperature by employing a standard vapor pressure formula as shown in Langer Handbook of Chemistry (1956) on page 1424.

Temperatures in the range of between about 250° C. to 350° C. can be maintained during the reaction between the spent powder and the mixture of organic halide and aluminum chloride.

In order that those skilled in the art will be better able to practice the invention the following example is given by way of illustration and not by way of limitation. All parts are by weight.

*Example 1*

There was charged to a reactor, fitted with a stirrer, and equipped with a sublimation chamber charged with anhydrous aluminum chloride connected to the methyl chloride input tube, 80 parts of spent powder containing 30% by weight of copper. The powder had been used until 60% by weight of its initial silicon had reacted. The powder was heated to a temperature of 260° C. with stirring, while methyl chloride was introduced at a rate of about 8 parts per hour at a pressure of 760 mm. During the first hour, the sublimation chamber was not heated. The reaction product that was produced as a result of passing the methyl chloride through the heated spent powder without the presence of aluminum chloride was weighed and analyzed to determine the mole percent of dimethylchlorosilane in the product. The sublimation chamber was then heated and maintained at 106° C. for the second hour while methyl chloride was passed through the spent powder at the same rate and under the same conditions as previously described. The product produced was weighed and analyzed to determine the effect, if any, the aluminum chloride had on the rate of formation and quality of the product as a result of introducing the aluminum chloride into the methyl chloride feed by sublimation. The temperature of the sublimation chamber was again raised to increase the concentration of the aluminum chloride in the methyl chloride feed following the same procedure. The range of temperature employed in heating the sublimation chamber, i.e., between 106° C. to 140° C., was sufficient to maintain aluminum chloride in the methyl chloride feed at a mole concentration of about 0.1 to 6.5 percent while the resulting mixture was passed through the spent powder.

Table I below shows the markedly improved rate of formation of methylchlorosilanes when the aluminum chloride was incorporated into the methyl chloride feed.

*Table I*

| Temp. of Sublimer | Mole Percent of AlCl₃ in Mixture | Percent Increase of Si Utilization | Parts of Product Per Hour | Percent Me₂SiCl₂ in Product |
|---|---|---|---|---|
| 25° C | 0 | 1.0 | 2.3 | 47.6 |
| 106° C | 0.1 | 2.6 | 2.8 | 52.4 |
| 115° C | 1.12 | 6.5 | 5.9 | 54.3 |
| 125° C | 3.1 | 10.4 | 7.9 | 39.0 |
| 128° C | 3.3 | 15.4 | 7.5 | 25.6 |
| 140° C | 6.5 | 20.2 | 7.2 | 16.4 |
| 123° C | 3.0 | 25.1 | 7.5 | 43.2 |

The above data clearly illustrate the effect of aluminum chloride on improving the production rate of methylchlorosilanes when it is incorporated with an organic halide and the resulting mixture is passed through spent powder while in a heated condition. Those skilled in the art would also know that the present invention provides a means of salvaging silicon values from spent powder by converting the silicon to increased amounts of diorganodihalogenosilanes.

While the above example is limited to only a few of the very many variables in the present invention, it should be understood that the present invention covers a much broader range of organohalogenosilanes as shown in Formula 2 that can be derived by effecting the reaction between spent silicon powder and an organic halide at elevated temperatures in the presence of aluminum chloride.

What I claim as new and desire to secure by Letters Patent of the United States is:

A process for the production of methylchlorosilanes comprising (1) passing a mixture of methylchloride and aluminum chloride through heated powdered silicon, and (2) recovering the methylchlorosilanes so produced, where there is present in said mixture of (1) from 0.1 to 10 mole percent of aluminum chloride, and where said powdered silicon of (1) is the solid residue of the reaction of a heated mixture of powdered silicon and a metal catalyst and an organic halide at temperatures in the range of 200° C. to 500° C., after 50 to 90% by weight of the silicon in said heated mixture has been reacted.

References Cited in the file of this patent

UNITED STATES PATENTS

| 2,759,960 | Nishikawa et al. | Aug. 21, 1956 |
| 2,786,861 | McEntree | Mar. 26, 1957 |
| 2,877,254 | Enk et al. | Mar. 10, 1959 |
| 2,949,481 | Anderson et al. | Aug. 16, 1960 |

FOREIGN PATENTS

| 673,436 | Great Britain | June 4, 1952 |
| 5,875 | Japan | July 18, 1956 |
| 20,712 | Germany | Jan. 24, 1961 |

OTHER REFERENCES

Rochow et al.: "Jour. Am. Chem. Soc.," vol. 67, October 1945, pp. 1772–4.